United States Patent
Austen et al.

(10) Patent No.: US 6,701,464 B2
(45) Date of Patent: Mar. 2, 2004

(54) METHOD AND SYSTEM FOR REPORTING ERROR LOGS WITHIN A LOGICAL PARTITION ENVIRONMENT

(75) Inventors: Christopher Harry Austen, Austin, TX (US); Douglas Wayne Oliver, Round Rock, TX (US); Mark Walz Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 09/798,288

(22) Filed: Mar. 1, 2001

(65) Prior Publication Data

US 2002/0124215 A1 Sep. 5, 2002

(51) Int. Cl.$^7$ ................................................ G06F 11/00
(52) U.S. Cl. ........................................... 714/48; 714/57
(58) Field of Search ............................. 714/20, 40, 45, 714/48, 57; 707/206

(56) References Cited

U.S. PATENT DOCUMENTS

| | | | | | |
|---|---|---|---|---|---|
| 4,914,586 | A | * | 4/1990 | Swinehart et al. | ......... 707/101 |
| 5,155,731 | A | * | 10/1992 | Yamaguchi | .................. 714/45 |
| 5,557,740 | A | * | 9/1996 | Johnson et al. | ............... 714/38 |
| 5,862,316 | A | * | 1/1999 | Hagersten et al. | ............ 714/15 |
| 6,199,070 | B1 | * | 3/2001 | Polo-Wood et al. | ........ 707/202 |
| 6,289,379 | B1 | * | 9/2001 | Urano et al. | ................. 709/223 |
| 6,594,785 | B1 | * | 7/2003 | Gilbertson et al. | ........... 714/48 |
| 6,611,858 | B1 | * | 8/2003 | Aravamudan et al. | ...... 709/203 |

* cited by examiner

Primary Examiner—Robert Beausoliel
Assistant Examiner—Gabriel Chu
(74) Attorney, Agent, or Firm—Sawyer Law Group LLP; Mark E. McBurney

(57) ABSTRACT

A method system for reporting error logs in a logical partition computer system is disclosed. Error logs reported for the computer system are stored in an error log partition. An event scan routine is instantiated for each of the logical partitions that make requests to read new error logs in the error log partition. In response to receiving a request from each of the event scan routines, the new error log is retrieved for the respective event scan routines. Once it has been determined that each of the logical partitions have read the new error log, the new error log is marked as ready for deletion in the error log partition.

30 Claims, 2 Drawing Sheets

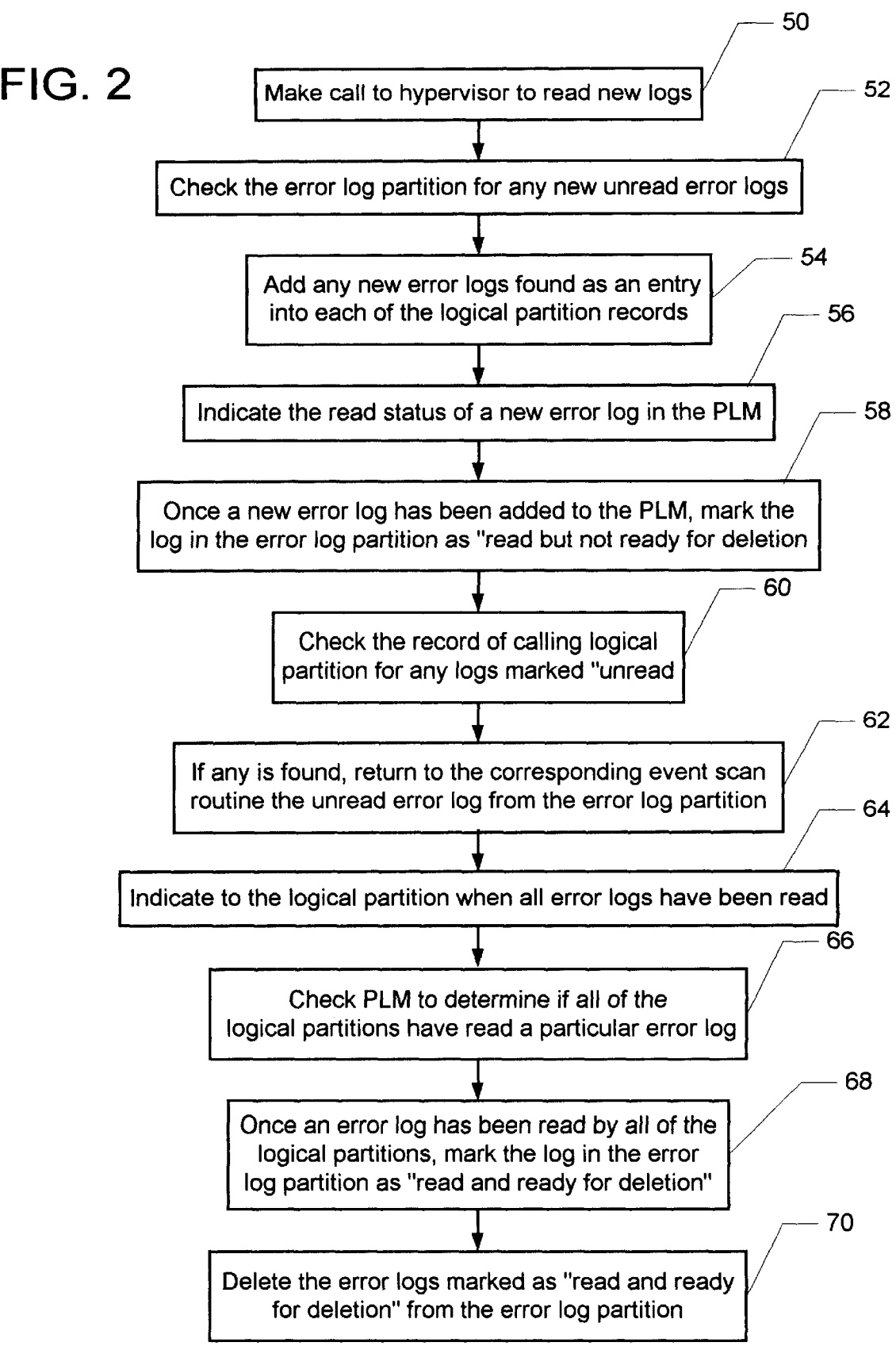

METHOD AND SYSTEM FOR REPORTING ERROR LOGS WITHIN A LOGICAL PARTITION ENVIRONMENT

FIELD OF THE INVENTION

The present invention relates to multiprocessor computer systems, and more particularly to a method and system for reporting error logs in a logical partition computer system.

BACKGROUND OF THE INVENTION

Logical partitioning is the ability to make a single multiprocessing system run as if it were one or more independent systems. Each logical partition represents a division of resources in the system and operates as an independent logical system. Each partition is logical because the division of resources may be physical or virtual. An example of logical partitions is the partitioning of a multiprocessor computer system into multiple independent servers, each with it own processors, main storage, and I/O devices.

One job of the operating system in a computer system is to periodically check the state of the machine, including looking for any error logs that have been reported by a service processor. Normally, there is only one operating system running in the system, and once the operating system checks the logs, the logs are typically marked as "read and ready for deletion" to make room for new error logs. In a LPAR system, however, there are multiple (and possibly different operating systems) running in the system. In this case, a first operating system cannot mark the logs ready for deletion, since the other operating systems also need to check the error logs.

Accordingly, what is needed is an improved method and system for reporting error logs in a logical partition computer system. The present invention addresses such a need.

SUMMARY OF THE INVENTION

The present invention provides a method and system for reporting error logs in a logical partition computer system. Error logs reported for the computer system are stored in an error log partition. An event scan routine is instantiated for each of the logical partitions that make requests to read new error logs in the error log partition. In response to receiving a request from each of the event scan routines, the new error log is retrieved for the respective event scan routines. Once it has been determined that each of the logical partitions have read the new error log, the new error log is marked as ready for deletion in the error log partition.

Accordingly, the present invention provides a method and system for reporting errors in a logical partition computer system that ensures error logs are not deleted before each logical partition has had a chance to read them.

BRIEF DESCRIPTION OF THE DRAWINGS

FIG. 2 is a flowchart illustrating a process for reporting error loss.

DESCRIPTION OF THE INVENTION

Figure 1:
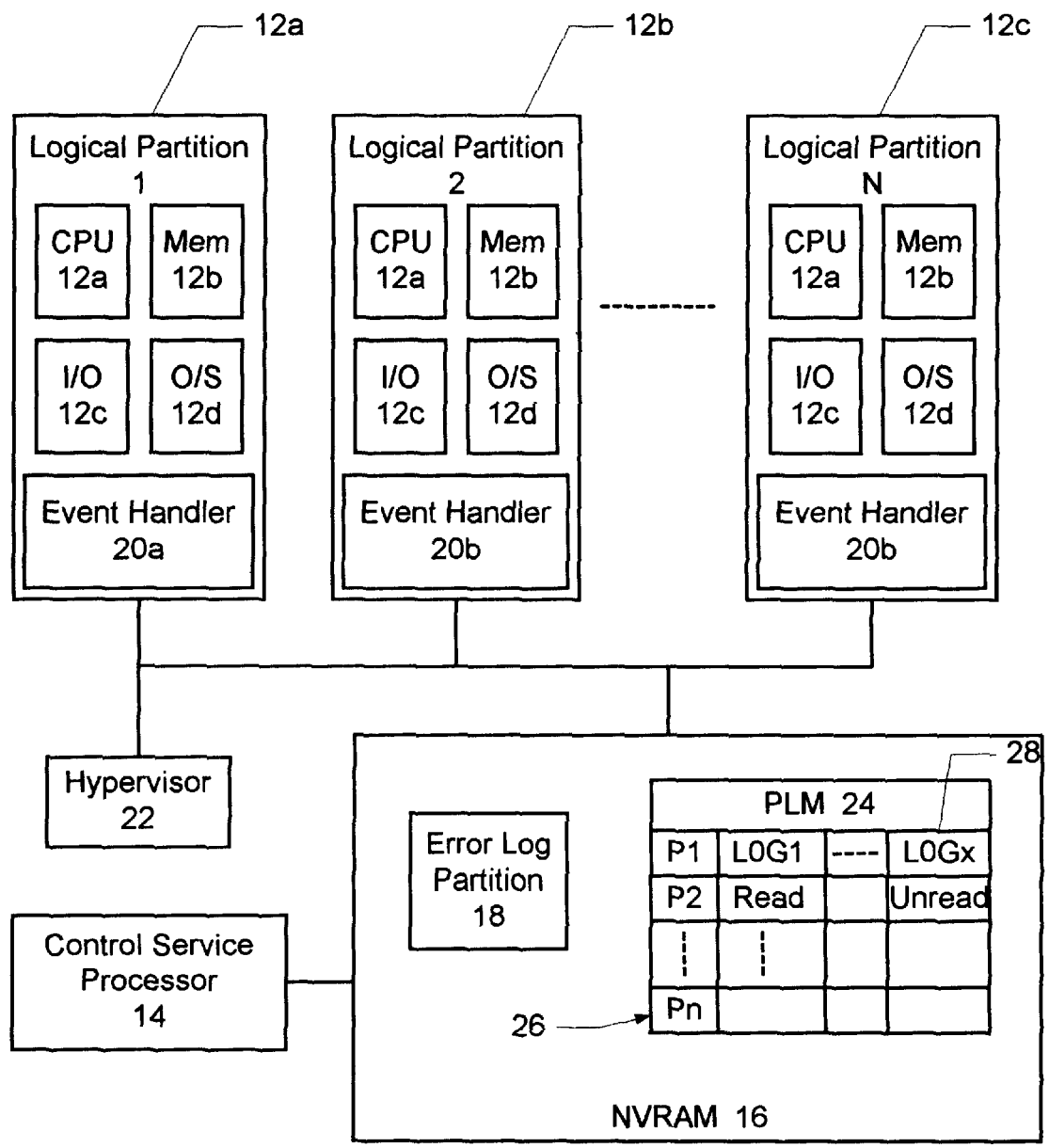
FIG. 1 is a block diagram illustrating a logical partition (LPAR) computer system having enhanced error log reporting capability in accordance with the present invention.

The present invention relates to the reading and deleting of error logs in a logical partition computer system. The following description is presented to enable one of ordinary skill in the art to make and use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiments shown but is to be accorded the widest scope consistent with the principles and features described herein.

FIG. 1 is a block diagram illustrating a logical partition (LPAR) computer system having enhanced error log reporting capability in accordance with the present invention. The system 10 includes multiple logical partitions 12, a control service processor 14, and a nonvolatile random access memory (NVRAM) 16. Each logical partition 12 has its own processor(s) 12a, memory 12b, and I/O devices 12c, and may run its own operating system 12d independently of the other logical partitions 12. In a preferred embodiment, the system 10 may have up to sixty-two logical partitions 12.

The control service processor (CSP) 14 monitors the logical partitions 12 and reports errors that occur within the system 10. The CSP 14 writes reportable error logs into an error log partition 18 stored in the NVRAM 16.

The system 10 may operate in single machine partition (SMP) mode or LPAR mode. In SMP mode, the operating system of the system 10 calls an event scan routine that checks the state of the machine by reporting any errors found in the error log partition 18. When the event scan routine reports "unread" error logs in the error log partition 18 to the operating system, the event scan routine marks the particular error log as "read and ready for deletion". On a periodic basis, the CSP 14 deletes the error logs marked as "read and ready for deletion" to free space for new log errors.

Whether the system 10 is operating in SMP mode or LPAR mode, the system 10 has only one error log partition 18. When the system 10 is operating in LPAR mode, however, the operating systems 12d running in each of the logical partitions 12 each need to check the state of the machine. Since the operating systems 12d in each of the logical partitions 12 need to read all of the error logs in the error log partition 18, it is imperative that each of the logical partitions 12 do not mark an error log as "read and ready for deletion" until all the logical partitions have had a chance to read the error log.

The present invention solves this problem by instantiating an event scan routine 20 for each of the logical partitions 12, and by providing a software program called a hypervisor 22 that accepts requests from each of the event scan routines 20 to read new error logs, and in response, retrieves the new error logs for the event scan routines 20. The hypervisor 22 keeps track of which logical partitions 12 have read which error logs, and only after it has been determined that each of the logical partitions 12 has read a particular error log does the hypervisor 22 mark the error log as ready for deletion in the error log partition 18.

In a preferred embodiment, the hypervisor 22 keeps track of which logical partition 12 has read which error logs by maintaining a list called a partition log matrix (PLM) 24 in NVRAM 16. The PLM 24 includes a record 26 for each logical partition 12 that includes a field 28 for each error log in the error log partition 18 indicating whether or not the logical partition 12 has read the error log.

FIG. 2 is a flow chart illustrating the process for reporting error logs in the LPR system 10 using a combination of the multiple event scan routines 20, the hypervisor 22, and the PLM 24 in accordance with one preferred embodiment the present invention. The process begins when one of the event scan routines 20 makes a function call to the hypervisor 22 requesting to read new error logs in step 50. In a preferred embodiment, the event scan routine 20 only requests a pointer to the new error log.

In response, hypervisor 22 will check the error log partition 18 for any new unread error logs in step 52. In a preferred embodiment, a new log is one in which the header is marked "unread and not ready for deletion".

If any new error logs are found, then the hypervisor 22 adds the log as an entry into each of the logical partition records 26 in the PLM 24 in step 54. The hypervisor 22 indicates the read status of a new error log in the PLM 24 by marking the entry as "unread by my partition" in the records 26 for each active logical partition 12, and by marking entry as "read by my partition" in the records 26 for each inactive logical partition 12 in step 56. Once a new error log has been added to the PLM 24, the hypervisor 22 also marks the log in the error log partition 18 as "read but not ready for deletion" in step 58.

After the hypervisor 22 adds new logs to the PLM 24, the hypervisor 22 checks the record 26 corresponding to the logical partition 12 that called the hypervisor 22 for any logs marked as "unread by my partition" in step 60. If any is found, then the hypervisor 22 returns to the corresponding event scan routine 20 the unread error log from the error log partition 18 in step 62. In a preferred embodiment, the hypervisor 22 returns a pointer to the unread error log. If the PLM 24 indicates that all of the error logs have been read by the corresponding logical partition 12 (i.e., marked as "read by my partition"), then the hypervisor 22 indicates such to the event scan routine 20 in step 64. In a preferred embodiment, this is done by the hypervisor 22 returning a known invalid pointer to the event scan routine 20.

Next, the hypervisor 22 checks the PLM 24 to determine if all of the logical partitions 12 have read a particular error log in step 66. This is indicated when the error log is marked in the records 26 of all the logical partitions 12 as "read by my partition". Once an error log has been read by all of the logical partitions 12, the hypervisor 22 marks the log in the error log partition 18 as "read and ready for deletion" in step 68. The control service processor 14, which periodically monitors the error log partition 18, then deletes the error logs marked as "read and ready for deletion" from the error log partition 18 in step 70.

A method and system for reporting error logs in LPAR system has been disclosed that ensures error logs are not deleted before each logical partition has had a chance to read them.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reporting error logs in a logical partition computer system, the error logs being stored in an error log partition, the method comprising the steps of:
   (a) instantiating an event scan routine for each of a plurality of logical partitions in the system;
   (b) in response to receiving requests to read a new error log from each of the event scan routines, retrieving the new error log for the respective event scan routines; and
   (c) once it has been determined that each of the plurality of logical partitions have read the new error logs in the error log partition, marking the new error logs as ready for deletion in the error log partition.

2. The method of claim 1 wherein step (b) further includes the step of keeping track of which of the logical partitions have read which error logs by maintaining a partition log matrix.

3. The method of claim 2 wherein step (b) further includes the step of providing the partition log matrix with a record for each of the logical partitions, wherein each record includes a field for each error log in the error log partition indicating whether or not the logical partition has read the error log.

4. The method of claim 3 wherein step (b) further includes the step of checking for new error logs by checking the error log partition for error logs that are marked as "unread".

5. The method of claim 4 wherein step (b) further includes the step of: for each new error log found, adding an entry for each new error log found to each of the records in the partition log matrix.

6. The method of claim 5 wherein step (b) further includes the step of: indicating a read status of the error log entries by marking the entry as "unread" in the records corresponding to active logical partitions, and by marking the entry as "read" in the records corresponding to inactive logical partitions.

7. The method of claim 6 wherein step (b) further includes the step of: marking the new error logs in the error log partition as "read but not ready for deletion".

8. The method of claim 7 wherein step (b) further includes the step of: after each entry for each new error log is added to the partition log matrix, checking the record corresponding to the logical partition that requested to read the new error logs for any error logs marked as "unread", and returning to a corresponding event scan routine the unread error logs from the error log partition.

9. The method of claim to 8 wherein step (c) further includes the step of: marking an error log as "read and ready for deletion" in the error log partition once all of the entries for the error logs are marked as "read" in the partition log matrix.

10. The method of claim 9 wherein step (c) further includes the step of: deleting all of the error logs in the error log partition that are marked "read and ready for deletion".

11. A logical partition computer system, wherein error logs reported for the system are stored in an error log partition, comprising:
   means for instantiating an event scan routine for each of a plurality of logical partitions in the system;
   means in response to receiving requests to read a new error log from each of the event scan routines, for retrieving the new error log for the respective event scan routine; and
   means for marking the new error logs as ready for deletion in the error log partition once it has been determined that each of the plurality of logical partitions have read the new error logs in the error log partition.

12. The system of claim 11 wherein a partition log matrix is used to determine which of the logical partitions have read which error logs.

13. The system of claim 12 wherein the partition log matrix includes a record for each of the logical partitions, wherein each record includes a field for each error log in the error log partition indicating whether or not the logical partition has read the error log.

14. The system of claim 13 wherein new error logs are found by checking the error log partition for error logs that are marked as "unread".

15. The system of claim 14 wherein for each new error log found, an entry for each new error log found is added to each of the records in the partition log matrix.

16. The system of claim 15 wherein a read status of the error log is indicated by marking the error log's entry as "unread" in the records corresponding to active logical partitions, and by marking the error log's entry as "read" in the records corresponding to inactive logical partitions.

17. The system of claim 16 wherein the new error logs are marked in the error log partition as "read but not ready for deletion".

18. The system of claim 17 wherein after each entry for each new error log is added to the partition log matrix, the record corresponding to the logical partition that requested to read the new error logs is checked for any error logs marked as "unread", and the unread error logs from the error log partition are returned to a corresponding event scan routine.

19. The system of claim 18 wherein once all of the entries for an error log are marked as "read" in the partition log matrix, the error log is marked as "read and ready for deletion" in the error log partition.

20. The system of claim 19 wherein all of the error logs in the error log partition that are marked "read and ready for deletion" are deleted by a control service processor.

21. A computer program product for reporting error logs in a logical partition computer system, the error logs being stored in an error log partition, for the computer program product having program instructions:

(a) instantiating an event scan routine for each of a plurality of logical partitions in the system;

(b) in response to receiving requests to read a new error log from each of the event scan routines, retrieving the new error log for the respective event scan routines; and (c) once it has been determined that each of the plurality of logical partitions have read the new error logs in the error log partition, marking the new error logsas ready for deletion in the error log partition.

22. The computer readable medium of claim 21 wherein instruction (b) further includes the instruction of keeping track of which of the logical partitions have read which error logs by maintaining a partition log matrix.

23. The computer readable medium of claim 22 wherein instruction (b) further includes the instruction of providing the partition log matrix with a record for each of the logical partitions, wherein each record includes a field for each error log in the error log partition indicating whether or not the logical partition has read the error log.

24. The computer readable medium of claim 23 wherein instruction (b) further includes the instruction of checking for new error logs by checking the error log partition for error logs that are marked as "unread".

25. The computer readable medium of claim 24 wherein instruction (b) further includes the instruction of: for each new error log found, adding an entry for each new error log found to each of the records in the partition log matrix.

26. The computer readable medium of claim 25 wherein instruction (b) further includes the instruction of: indicating a read status of the error log entries by marking the entry as "unread" in the records corresponding to active logical partitions, and by marking the entry as "read" in the records corresponding to inactive logical partitions.

27. The computer readable medium of claim 26 wherein instruction (b) further includes the instruction of: marking the new error logs in the error log partition as "read but not ready for deletion".

28. The computer readable medium of claim 27 wherein instruction (b) further includes the instruction of: after each entry for each new error log is added to the partition log matrix, checking the record corresponding to the logical partition that requested to read the new error logs for any error logs marked as "unread", and returning to the a corresponding event scan routine the unread error logs from the error log partition.

29. The computer readable medium of claim 28 wherein instruction (c) further includes the instruction of: marking an error log as "read and ready for deletion" in the error log partition once all of the entries for the error logs are marked as "read" in the partition log matrix.

30. The computer readable medium of claim 29 dedicated wherein instruction (c) further includes the instruction of: deleting all of the error logs in the error log partition that are marked "read and ready for deletion".

* * * * *